(12) United States Patent
Van Sickle

(10) Patent No.: US 9,230,453 B2
(45) Date of Patent: Jan. 5, 2016

(54) OPEN-DITCH PIPELINE AS-BUILT PROCESS

(71) Applicant: Jan Lee Van Sickle, Denver, CO (US)

(72) Inventor: Jan Lee Van Sickle, Denver, CO (US)

( * ) Notice: Subject to any disclaimer, the term of this patent is extended or adjusted under 35 U.S.C. 154(b) by 0 days.

(21) Appl. No.: 14/273,122

(22) Filed: May 8, 2014

(65) Prior Publication Data

US 2014/0346223 A1 Nov. 27, 2014

Related U.S. Application Data

(60) Provisional application No. 61/826,005, filed on May 21, 2013.

(51) Int. Cl.
  *G09B 25/02* (2006.01)
  *G06Q 10/06* (2012.01)
  *G01C 11/02* (2006.01)

(52) U.S. Cl.
  CPC ............... *G09B 25/02* (2013.01); *G01C 11/02* (2013.01); *G06Q 10/06* (2013.01); *G06F 2217/34* (2013.01)

(58) Field of Classification Search
  CPC ........ F16L 1/00; F16L 2201/60; G09B 25/02; G06Q 10/06; G01C 11/02; G06F 2217/34; G06T 2200/08; G06T 19/006
  See application file for complete search history.

(56) References Cited

U.S. PATENT DOCUMENTS

2013/0221091 A1* 8/2013 Koo ............................... 235/375
2013/0228620 A1* 9/2013 Ahern et al. .................. 235/439

* cited by examiner

*Primary Examiner* — Kristy A Haupt
(74) *Attorney, Agent, or Firm* — Sheridan Ross P.C.

(57) ABSTRACT

Imaging, attribution, and 3D modeling of utility pipelines and other assets is accomplished through the processing of terrestrial photogrammetric, aerial photogrammetric, and/or 3D LiDAR scanning measurements, all of which may be augmented by an Inertial Measurement Unit. These measurements are spatially controlled by photo-identifiable targets whose positions are established by real-time or post-processed GPS measurements which, in turn, determine the relative and absolute positions of the resulting 3D model. The necessary attribute information is available the moment an optically readable code is affixed to the asset. All proposed data collection methods provide imagery and point clouds systematically. It is therefore possible to read the attributes encoded in the optically readable code directly from the imagery or point cloud. Both the attributes of the feature and the position of the encoded attributes on the feature are captured. The information unique to each joint of pipe is attached to that joint positionally.

30 Claims, 18 Drawing Sheets

OPEN-DITCH PIPELINE AS-BUILT PROCESS

CROSS-REFERENCES TO RELATED APPLICATIONS

This application claims the benefit of U.S. Provisional Application Ser. No. 61/826,005 filed on May 21, 2013 titled "IMPROVED OPEN-DITCH PIPELINE AS-BUILT PROCESS" which is incorporated herein by reference in its entirety for all that is taught and disclosed therein.

BACKGROUND

Technical Field

The invention is relevant to collecting the position and attributes of oil, gas, utility pipelines and other assets in an open ditch or trench before it is backfilled.

SUMMARY

This Summary is provided to introduce in a simplified form a selection of concepts that are further described below in the Detailed Description. This Summary is not intended to identify key or essential features of the claimed subject matter, nor is it intended to be used to limit the scope of the claimed subject matter.

In the oil and gas industry and other utility industries, the process of collecting the position and attributes of a pipeline (oil, gas, water, sewer, etc.), or fiber-optic or copper cables, or other types of assets in the open ditch or trench before it is backfilled is simultaneously necessary and unpopular. It is necessary for safety (i.e., future one-call protection—a number to call before you dig to have underground utilities marked), maintenance, and management of the asset. It is unpopular because as currently accomplished the entire workflow is complicated, slow, error prone, and expensive. The work is done to achieve the following goals:

1. Absolute Position of the Asset—Determination and recording of the absolute position of the asset (e.g., a pipeline, cable, or other asset) means the establishment of its relation to an officially defined datum and coordinate system which in the United States often means the National Spatial Reference System (NSRS), defined and managed by the National Geodetic Survey (NGS).

2. Relative Position of the Asset—Determination and recording of the relative position of the asset means the establishment of the position of each of its components in relation to the others. In other words, it means the position of the asset in relation to itself.

3. Attribution of the Asset—Attribution is the capture and recording of the non-spatial data about the asset, such as Yield Strength, Joint Number, Manufacturer, etc.

4. Imagery of the Asset—When the asset is buried it can no longer be seen. The imagery captured and recorded in this process provides that visibility after the asset is buried.

5. Three-Dimensional Model of the Asset—The size and orientation of the asset and each of its components in three dimensions helps to ensure proper facility management.

6. Linkage of the Asset With Its Position, Its Attributes, Its Image, And Its 3D Digital Model—This aspect is the assignment of the appropriate attributes to the correct relative positions, absolute positions, imagery, and 3D model of the asset.

FIG. 1A shows an example of a photo identifiable terrestrial target affixed to the ground with a known center and at a known place (i.e., GPS coordinates secured by a GPS receiver). This is the type of target that could be used when the imagery is collected with terrestrial photogrammetry (photography captured from the ground). The target shown in FIG. 1A may be quite small, about the size of a quarter.

FIG. 1B shows an example of a photo identifiable aerial target affixed to the ground with a known center and at a known place (i.e., GPS coordinates secured by a GPS receiver). This is the type of target that could be used when the imagery is collected from an aerial vehicle (photography captured from the air) and is large enough to be seen from the air.

These targets are utilized in establishing the absolute and relative positions of the asset and are utilized in photogrammetry applications as is known in the prior art. The targets can be any object that has a known center and place.

FIG. 2 depicts a typical open-ditch pipeline as-built survey known in the prior art. A two-person crew is in the open ditch or trench. One person collects the data with a GPS receiver and logs attributes, information about the pipe, and associated features. The other person records much the same information in hard-copy notes. This operation can also be done by just one person, and can also be done without the operator being in the ditch.

The result of this work is a hard copy drawing and/or digital file in which the pipeline and other features are represented with 2D points and lines as shown in a simplified form in FIG. 3. A line in profile represents the vertical aspect and attributes are provided in text fields. Days, sometimes weeks, are necessary for the production of this deliverable. During this period the pipeline is not afforded one-call protection. This fact alone makes the existing process unacceptable.

Thus, there is need in the art for a new and improved process for data collection, attribution, and data base storage of open-ditch pipeline as-built data that can be acquired more quickly, more efficiently, and at less cost. An improved process must be capable of providing the following:

1. It must produce a 3D model of the pipeline or other asset in the ditch or trench and establish both the relative and absolute position of the assets in the 3D model. FIG. 4 shows a 3D model in top view of a Ditch 1 having a Joint 2 that has a Weld 3.

2. It must produce a 3D model of all attendant features in the ditch or trench, such as Foreign Crossings 4, Risers 5, Trench Breakers 6, Tees 7, etc., as shown if FIGS. 5-8, and establish both the relative and absolute position of the assets in the 3D model.

3. It must capture and record data about the non-spatial attributes of the asset (e.g., a pipeline), such as Yield Strength, Joint Number, Manufacturer, etc. (as shown on pipes in FIGS. 9, and 10, and on a label as shown in FIG. 11) and assign the appropriate attributes to the correct relative and absolute positions on the asset. For example, FIG. 11 shows an exemplary label for a steel pipe. The following information is contained in the label and the numbers below correspond to the numbers on the label:

1. Coil Number
2. Run Number
3. Pipe Number Within Each Coil
4. Heat Number From Steel Manufacturer
5. Pipe Weight And Weight Per Foot
6. Pipe Outside Diameter
7. Pipe Grade
8. Pipe Wall Thickness
9. Date Pipe Was Manufactured
10. Hydrostatic Test Pressure
11. Third Party Inspection
12. Customer Purchase Order
13. Pipe Length 14. ISO Control Number Additional important attributes, not shown on the illustrated label, may include: YieldYield Strength, Joint Number, Manufacturer, X-Ray Number, etc.

4. It must capture and record the necessary attributes of the attendant features on the asset, such as Bends 8, Flanges 9, Valves 10, Welds 11, etc., some of which are described below and as shown in FIGS. 12, 13, and 14.

1. Valve
   a. Type (Ball, Block, Gate, etc.)
   b. Serial Number
   c. Size
2. Welds
   a. Type (Cross over, tie-in, mainline, etc.)
   b. X-ray number
   c. Joint Number
      i. Upstream
      ii. Downstream
3. Bends
   a. Type (Sag, Over, Combination, etc.)
   b. Bend number
   c. Technique
      i. Hot
      ii. Cold
   d. Diameter
   e. Wall thickness
   f. Degree of Bend
4. Flange
   a. Diameter The detailed description below describes how data collection in the improved method for building a 3D model is accomplished through either Three-Dimensional LiDAR Scanning (3DLS) technology or terrestrial photogrammetry. These techniques are augmented with the use of GPS measurements and sometimes further augmented with an Inertial Measurement Unit (IMU), either in real-time or through photo-identifiable targets, for the determination of relative and absolute positions of the assets captured in the 3D model.

As used herein, "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together. When each one of A, B, and C in the above expressions refers to an element, such as X, Y, and Z, or class of elements, such as X1-Xm, Y1-Yn, and Z1-Zo, the phrase is intended to refer to a single element selected from X, Y, and Z, a combination of elements selected from the same class (e.g., X1 and X2) as well as a combination of elements selected from two or more classes (e.g., Y1 and Z3).

It is to be noted that the term "a entity" or "an entity" entity refers to one or more of that entity. As such, the terms "a" (or "an"), "one or more," and "at least one" can be used interchangeably herein. It is also to be noted that the terms "comprising," "including," and "having" can be used interchangeably.

Figure 1A:
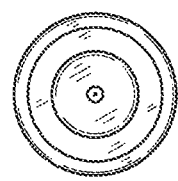
FIGS. 1A and 1B show examples of photo identifiable targets affixed to the ground with known centers and at known places.

To assist in the understanding of the present disclosure the following list of components and associated numbering found in the drawings is provided herein:

| Table of Components | |
|---|---|
| Component | # |
| Ditch | 1 |
| Joint | 2 |
| Weld | 3 |
| Foreign Crossings | 4 |
| Risers | 5 |
| Trench Breakers | 6 |
| Tees | 7 |
| Bends | 8 |
| Flanges | 9 |
| Valves | 10 |
| Welds | 11 |
| QR Codes | 12 |
| Targets | 13 |
| Pipe | 14 |
| Jersey Barrier | 15 |
| Digital Photographs | 16 |

-continued

Table of Components

| Component | # |
| --- | --- |
| Squares | 17 |
| QR Reader | 18 |
| Bar-Code | 19 |
| Operator | 20 |
| LiDAR Scanner | 21 |
| Asset | 22 |
| Ground | 23 |
| Trench | 24 |
| Arrow | 25 |
| Cameras | 26 |
| Bracket | 27 |
| Angle Bar | 28 |
| Drone | 29 |
| As-Built Process | 100 |
| As-Built System | 102 |

DETAILED DESCRIPTION

With the computing environment in mind, embodiments of the present invention are described with reference to logical operations being performed to implement processes embodying various embodiments of the present invention. These logical operations are implemented (1) as a sequence of computer implemented steps or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts, applications, or modules. It will be recognized by one skilled in the art that these operations, structural devices, acts, applications, and modules may be implemented in software, firmware, special purpose digital logic, and any combination thereof without deviating from the spirit and scope of the present invention as recited within the claims attached hereto.

Figure 15:
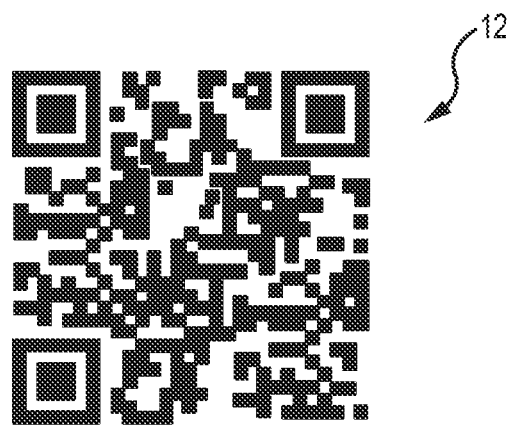
FIG. 15 shows an example of a Quick Response (QR) code.

Referring now to the Figures, like reference numerals and names refer to structurally and/or functionally similar elements thereof, and if objects depicted in the figures that are covered by another object, as well as the tag line for the element number thereto, may be shown in dashed lines. FIG. 15 shows an example of a Quick Response (QR) code. While the 3D model of the asset, such as a pipeline and attendant features, is important, the attributes, that is, the information about that asset and those features, is of equal importance. It is possible to encode the necessary attribute information at the moment it is available in a QR Code 12 as shown in FIG. 15, or another optically readable code such as a bar code printed on the pipe (see FIG. 35).

Figure 11:
FIG. 11 shows an example of a label for a steel pipe.
Figure 12:
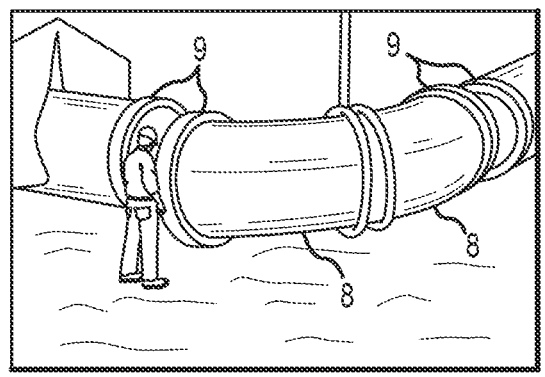
FIGS. 12, 13, and 14 show examples of the necessary attributes and attendant features of assets, such as valves, welds, bends, flanges, etc., that need to be captured and recorded.
Figure 13:
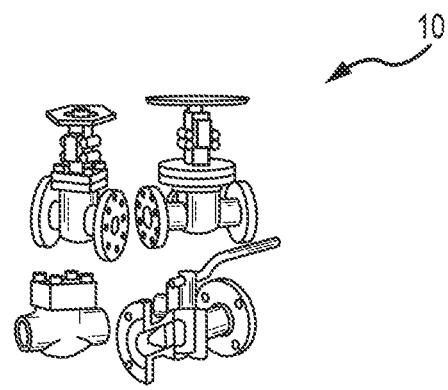
Figure 14:
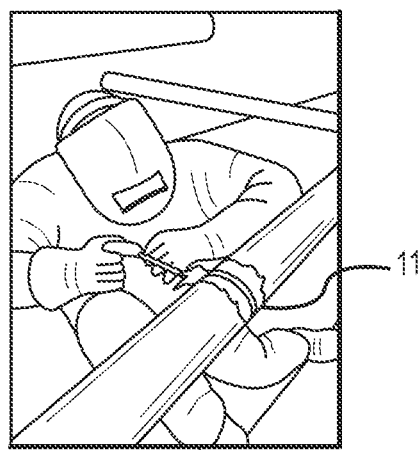
Figure 16:
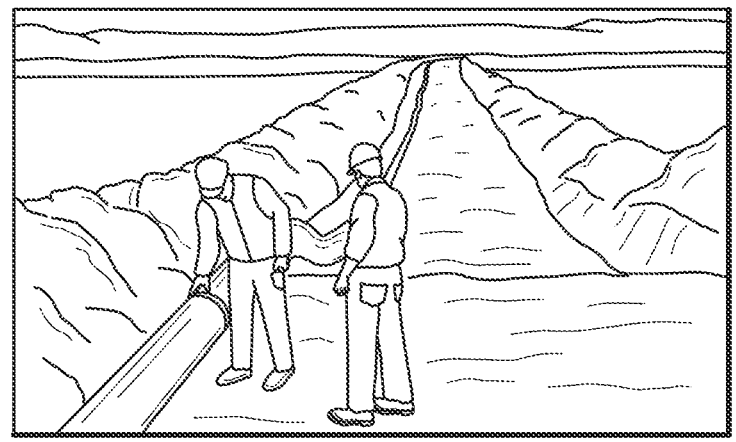
FIG. 16 shows a typical string of pipe along a ditch or trench into which it will be laid.

It is typical to string pipe along the ditch or trench into which it will be laid (see FIG. 16). It is at this stage, just before it is picked up and placed in the ditch or trench that a single or a block of two or more QR codes or other optically readable code, such as a bar code, can be pasted or otherwise affixed in some manner onto each joint of pipe containing the desired attributes. Alternatively, the QR codes can be affixed to the pipe after it is positioned in the ditch or trench, or, printed on the pipe by the manufacturer before it arrives in the field. Examples of such attributes are described above with reference to FIG. 11.

Figure 17:
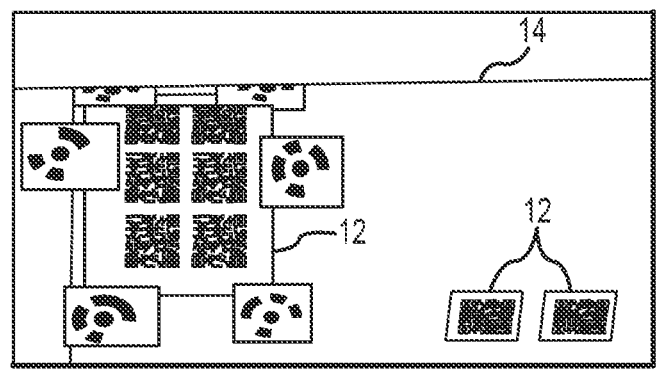
FIG. 17 shows an example of a pipe with a block of QR Codes affixed on the pipe.

FIG. 17 shows an example of a Pipe 14 with a block of QR Codes 12 affixed on Pipe 14 in one location, and individual QR Codes 12 affixed in different locations. QR Codes 12 may contain the information described above for the particular pipe.

Data collection methods, such as terrestrial photogrammetry, aerial photogrammetry, and 3DLS, provide imagery and point clouds systematically. It is therefore possible to read the attributes encoded in the QR Code 12 directly from the imagery and/or point cloud. In this way it is possible to capture both the attributes of the feature and the position of the encoded attributes on the feature. In this way the information unique to each joint of pipe is attached to that joint positionally.

Three-Dimensional LiDAR Scanning

With respect to 3DLS, when a laser is pointed at the asset, the beam of light is reflected by the surface it encounters. A sensor records this reflected light to measure a range. When laser ranges are combined, the result is a dense, detail-rich group of elevation points, called a "point cloud." Each point in the point cloud has three-dimensional spatial coordinates (latitude, longitude, and height) that correspond to a particular point on the asset and surrounding area from which a laser pulse was reflected.

Figure 18:
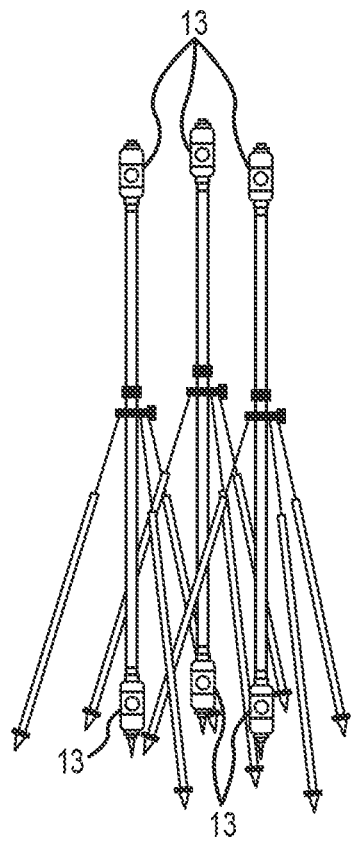
FIG. 18 shows an example of targets for determining position for control purposes mounted on a tripod.
Figure 19:
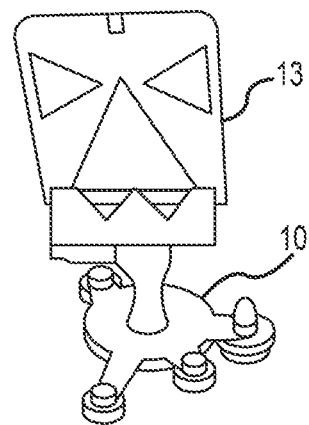
FIG. 19 shows an example of a target for determining position for control purposes mounted on an asset.

This technology can be applied on a smaller scale to an asset in a trench, such as a pipe. Data collection utilizing 3DLS is extremely quick. Targets 13 for determining position for control purposes may be mounted on a tripod as shown in FIG. 18, or simply placed on an asset, such as Valve 10, as shown in FIG. 19. The object on the control point could be anything with a clearly defined center that can be identified exactly in a photo or in a LiDAR scan. The primary purpose is to be stable and clearly represent a known position in the work.

Figure 1B:
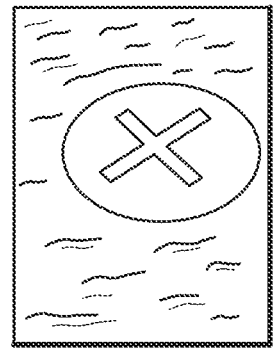
Figure 2:
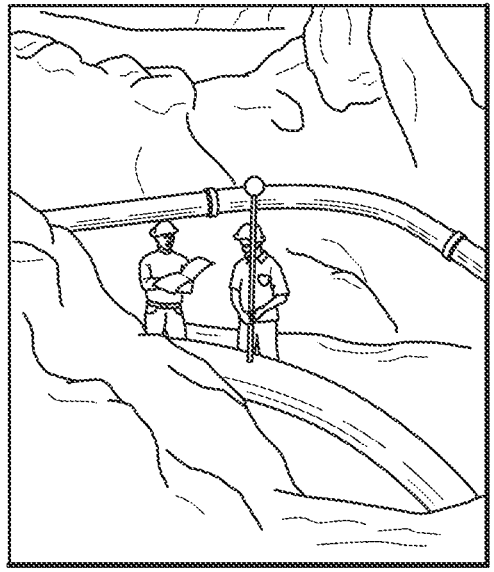
FIG. 2 shows a typical open-ditch pipeline as-built survey.
Figure 3:
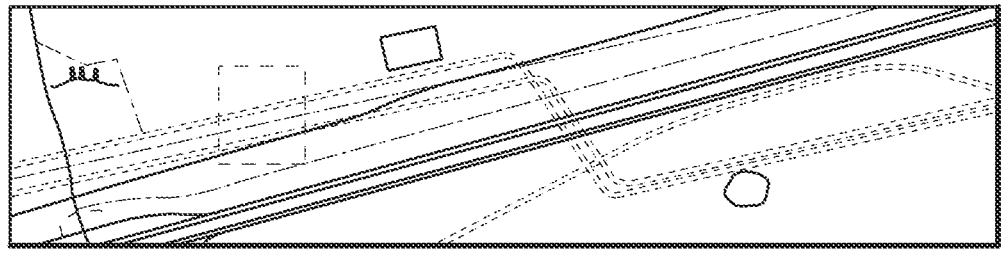
FIG. 3 shows a hard copy drawing of a pipeline and other features represented with 2D points and lines.
Figure 4:
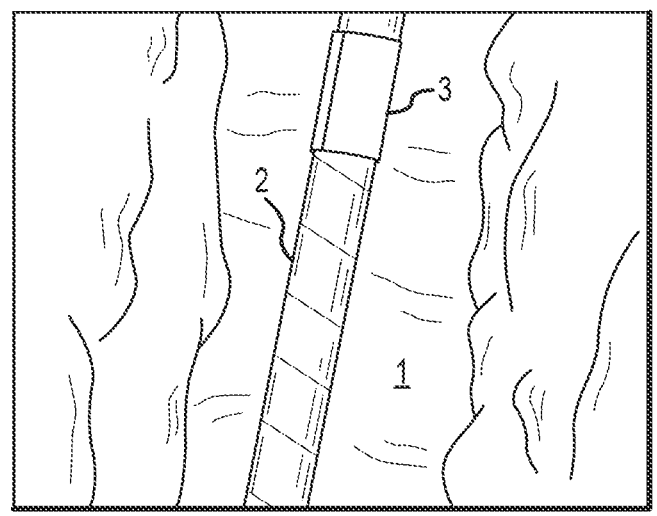
FIG. 4 shows a top view of a portion of a ditch or trench having a joint and a weld.
Figure 5:
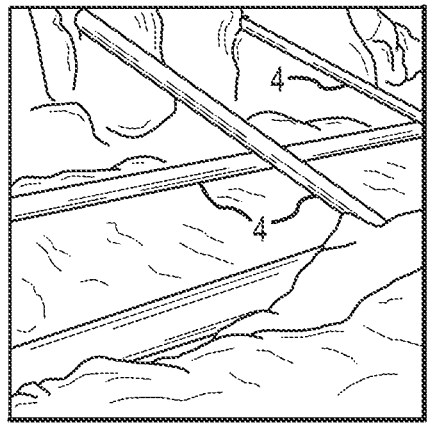
FIG. 5 shows an example of a ditch or trench with foreign crossings.
Figure 6:
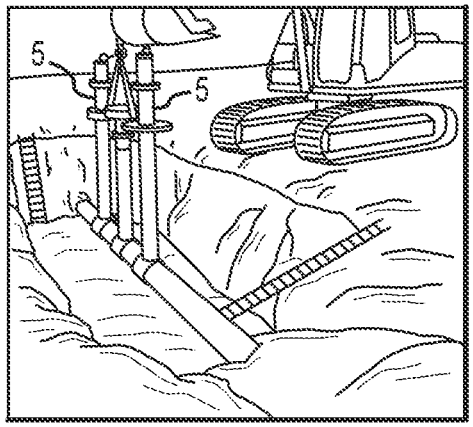
FIG. 6 shows an example of a ditch or trench with valves.
Figure 7:
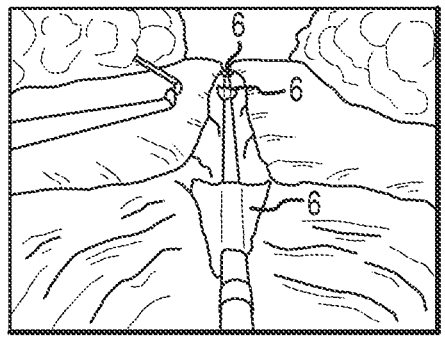
FIG. 7 shows an example of a ditch or trench with a trench breaker.
Figure 8:
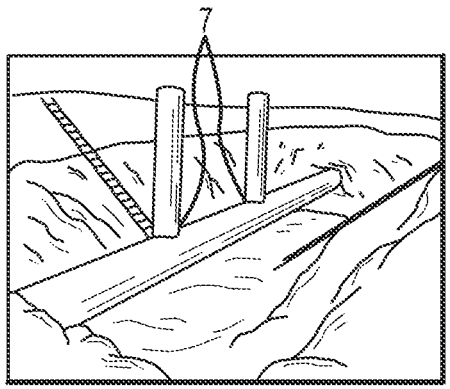
FIG. 8 shows an example of a ditch or trench with a pipe having tees.
Figure 9:
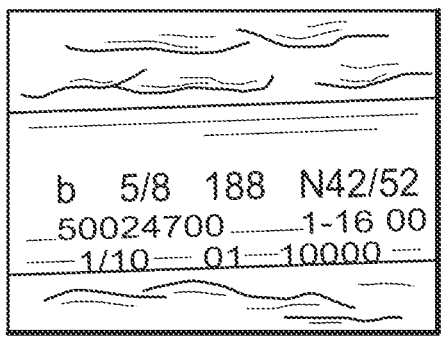
FIGS. 9 and 10 show examples of the non-spatial data about an asset that needs to be captured and recorded.
Figure 10:
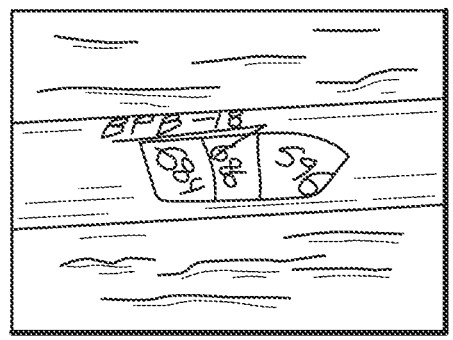
Figure 37:
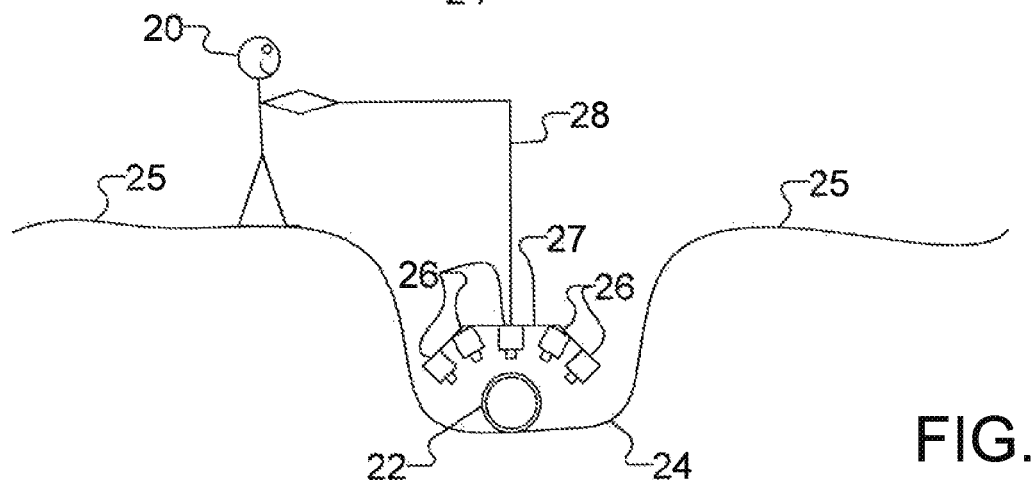
FIG. 37 shows a cross-section view of a worker walking the length of an asset in a trench with a plurality of cameras connected to a bar in one embodiment.

FIG. 37 shows a perspective view of a person walking the length of an asset with a handheld LiDAR scanner. Referring now to FIG. 37, Operator 20 aims LiDAR Scanner 21 at the Asset 22 in the Trench 23. Operator 20 then walks on the Ground 23 along Trench 24 in the direction indicated by Arrow 25. In addition to images of Asset 22, images of any Targets 13 placed on Asset 22 (see FIGS. 17 and 19) or on Ground 23 (see FIGS. 1-3) near Trench 24 are also captured with LiDAR Scanner 21 (Targets 13 not shown in FIG. 37).

Figure 20:
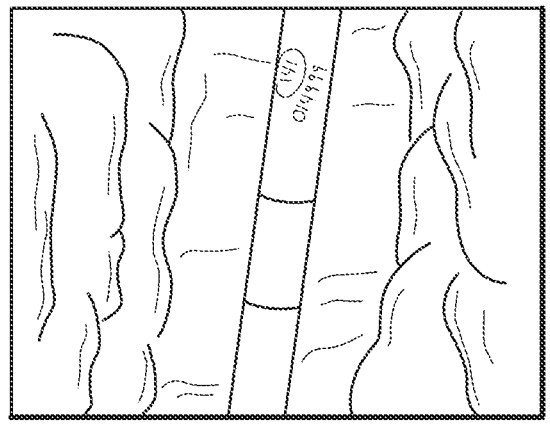
FIG. 20 shows the results of a processed scan done with a LiDAR scanner.
Figure 36:
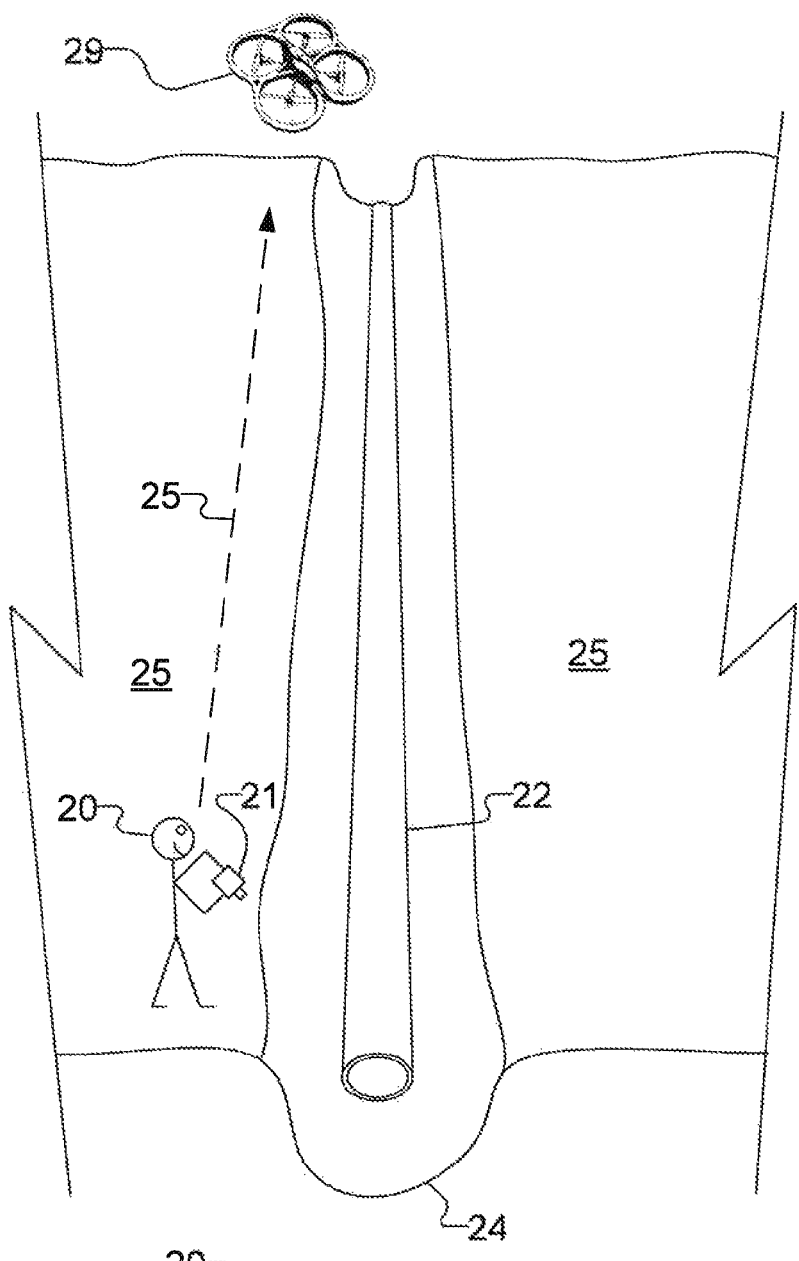
FIG. 36 shows a perspective view of a worker walking the length of an asset with a handheld LiDAR scanner in one embodiment.

The still picture shown in FIG. 20 was captured from the results of a processed scan done with a handheld LiDAR scanner, such as LiDAR Scanner 21, by an Operator 20 walking along the side of a ditch or trench in which a gas pipeline has been laid, like that shown in FIG. 36. The processed image shows a three dimensional point cloud of the pipe. Writing on the pipe is clearly visible along with other features of the pipe. The LiDAR scanner may be mounted on a tripod rather than being hand held, and the tripod and LiDAR scanner moved periodically along the length of the ditch.

Terrestrial Photogrammetry

An example of terrestrial photogrammetry is shown in FIGS. 21-34, which represent portions of display screen captures showing various images generated by one or more computer programs. A quickly shot series of nine digital photographs or video can be taken with a simple hand held camera from one side of the pipe in the ditch or trench. The photography or video can also be done from the air, i.e., by a camera on a Drone 29 (Unmanned Aerial System—UAS) as shown in FIG. 36. A typical overlap of one photo to the next is about 60%. In this example, the photos were processed with AutoCAD and Photo Soft software packages. However, other software products beside AutoCAD and Photo Soft could also be utilized.

Also, instead of just one camera, an array of four, five, or six cameras may be used as shown in FIG. 37. Referring now to FIG. 37, five Cameras 26 are affixed to a Bracket 27 and attached to an Angle Bar 28 that can be lowered into Trench 24 while Operator 20 stands on Ground 23 above Trench 24. With one pass, photos of Asset 22 taken by each Camera 26 and taken from various angles can be secured. Angle Bar 28 may also be a T-shaped bar with a second Operator 20 walking along on the other side of Trench 24 with each Operator 20 holding onto one of the ends of the T-shaped bar.

Figure 21:
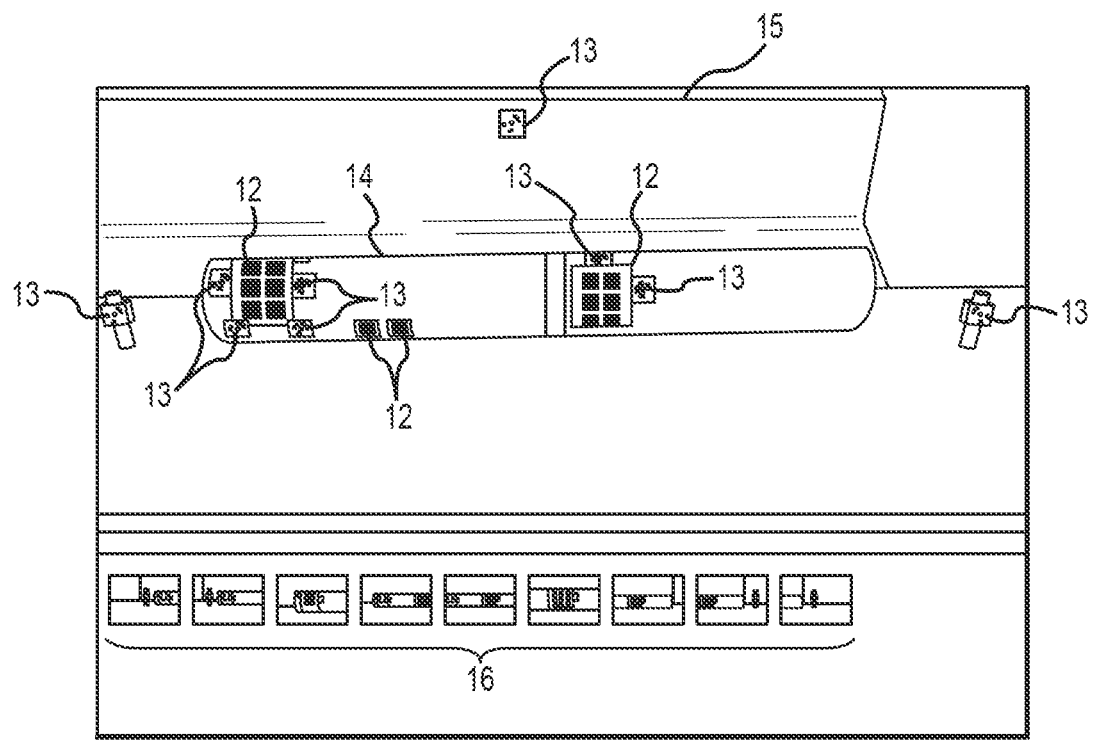
FIGS. 21-34 show representations of screen captures from a computer display that demonstrate capturing QR Code data messages from a close range photogrammetric model to an AutoCAD point database.

The details of the process used in the terrestrial photogrammetry solution are discussed below. The images shown in FIGS. 21-34 are portions of screen captures from a computer display that demonstrate capturing QR code data messages from a close range photogrammetric model to an AutoCAD point database. Shown in FIG. 21 is a 3D model of a twelve-inch-diameter Pipe 14 in front of a Jersey Barrier 15. There are three Targets 13 placed in the 3D model used for geo-referencing. At each joint in the pipe, a two-by-three array of three-inch square QR Codes 12 was placed, along with an additional target. The 3D model was created from nine Digital Photographs 16 taken along the length of the real pipe and jersey barrier. Custom software is utilized to generate the 3D model.

Figure 22:
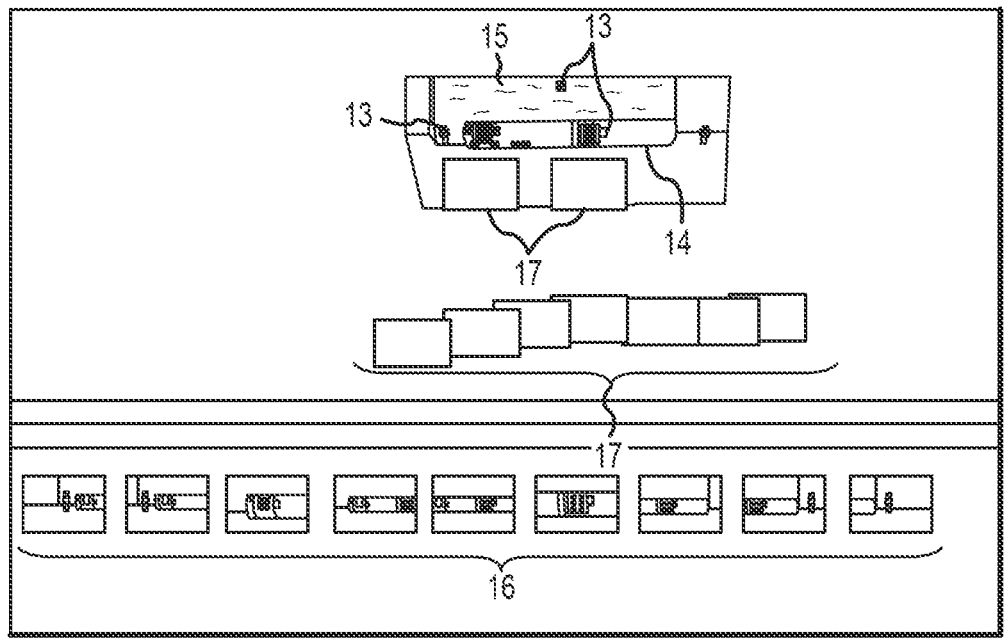

Zooming out, the Squares 17 indicating the camera positions can be seen as shown in FIG. 22, seven from fifteen feet away, and two from close up.

Figure 23:
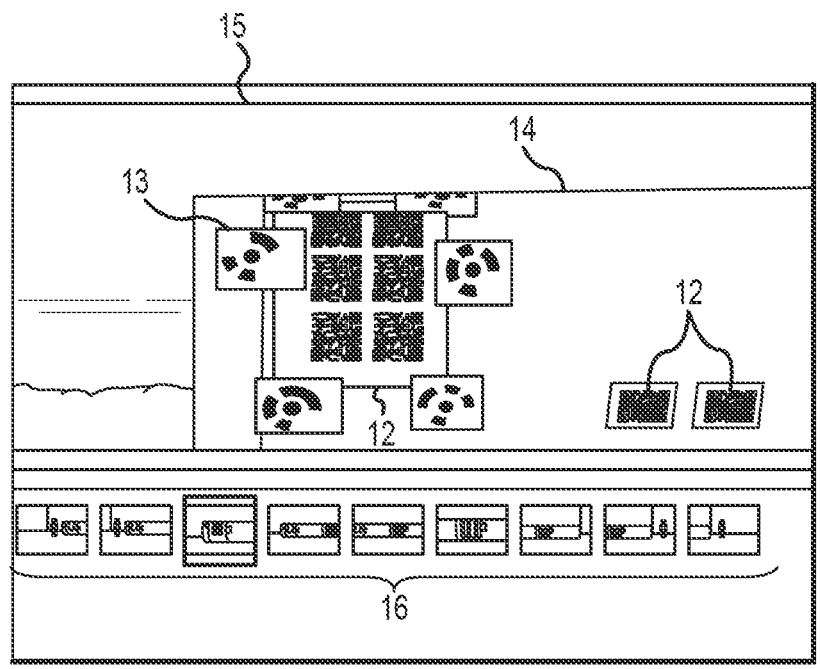

The Digital Photographs 16 were taken from left to right, approximately fifteen feet from Pipe 14 (seven photographs). At each joint, a close-up image was taken (two photographs) of the QR Codes 12 at the joints as shown in FIG. 23. Two of the Targets 13 have an array of QR Codes 12 adjacent to them. Multiple copies of the same QR Code 12 are affixed to the segment (joint) of pipe because it is unpredictable how the pipe will be rotated when it is lifted and positioned into the ditch or trench. In this way it is probable that at least one of them will be visible. The other Targets 13 shown are utilized in the photogrammetric process to tie the individual Digital Photographs 16 together from which the 3D model is developed. When Pipe 14 is laid (strung) beside the ditch or trench and being assembled, this is a time when the QR Codes 12 may be affixed on each segment (joint) of the pipe. Or, the QR Codes 12 may be placed on the asset after it is positioned in its permanent place in the ditch or trench. Alternatively, the QR Codes 12 may be actually printed, glued, pasted, or otherwise affixed on the outside of Pipe 14 by the manufacturer before arriving in the field. QR Codes 12 and photogrammetric Targets 13 (if that technology is used instead of LiDAR scanning) may be built into Pipe 14 itself.

Figure 24:
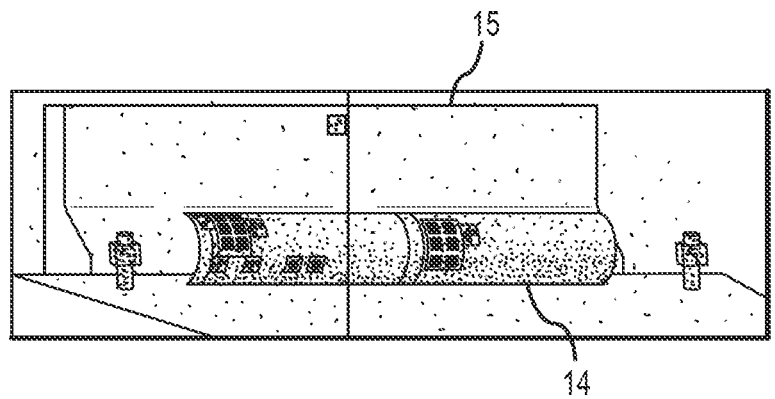

The 3D model can be exported as an LAS file. The quality is set to ultra-high and the points are colored according to the photography. The 3D model can also be exported as an ortho-photo. In this case, the projection plane is top and the blending is mosaic. In AutoCAD, the LAS file is used to create a point cloud object as shown in FIG. 24.

Figure 25:
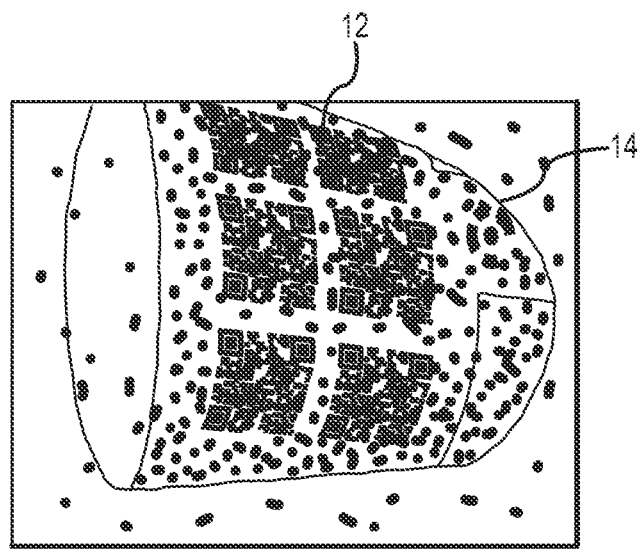

Listing the object shows that there are a total of over 21 million points in the 3D model, but only approximately 3 million points are displayed by AutoCAD. Using another viewer, such as Photo Soft, a close-up of the QR Code 12 array is shown in FIG. 25. The curvature of Pipe 14, along with the density of the point cloud is shown.

Figure 26:
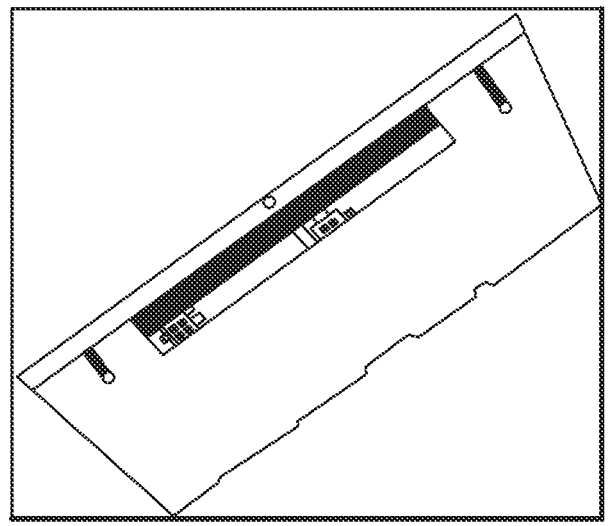

Going back to AutoCAD, the view shown in FIG. 26 is switched to a top view and the ortho-photo just created in Photo Soft is inserted. In this case, only the layer that the image is on is turned on.

Figure 27:
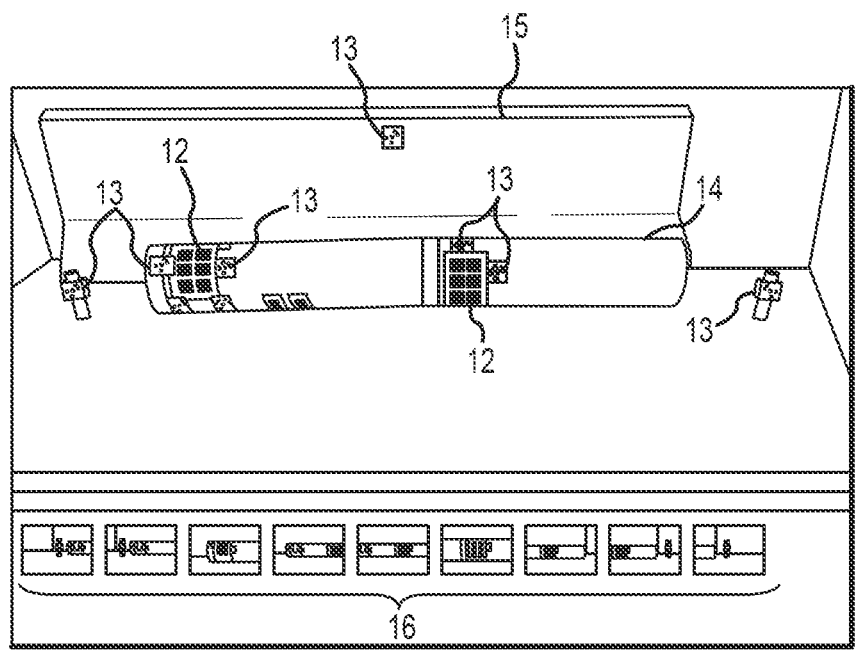

In Photo Soft, the target positions can be exported as a CSV file. Switching to the ground control plane as shown in FIG. 27, the three Targets 13 that were used for geo-referencing with known positions from the ground survey can be seen. Two additional Targets 13 which were used to mark the QR Codes 12 can also be seen.

Figure 28:
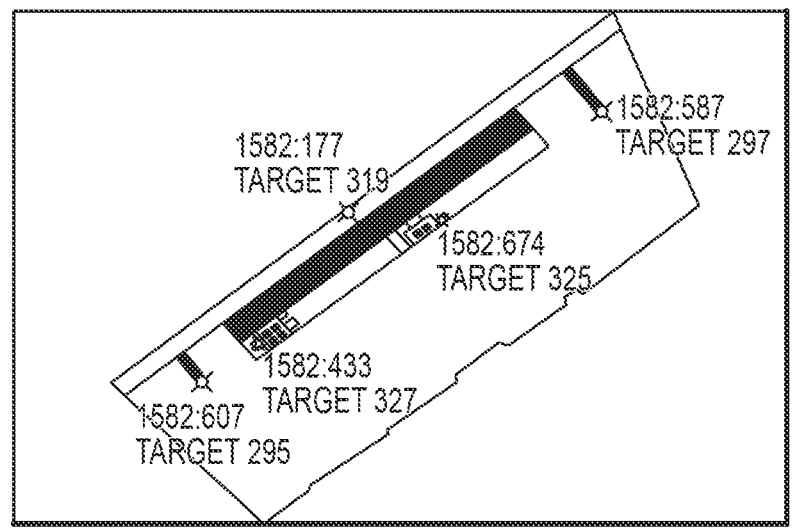

These Target 13 positions are exported to a CSV file, which is read by AutoCAD. Switching to AutoCAD, the points are imported and the points come in right on the targets in the image as shown in FIG. 28.

Figure 29:
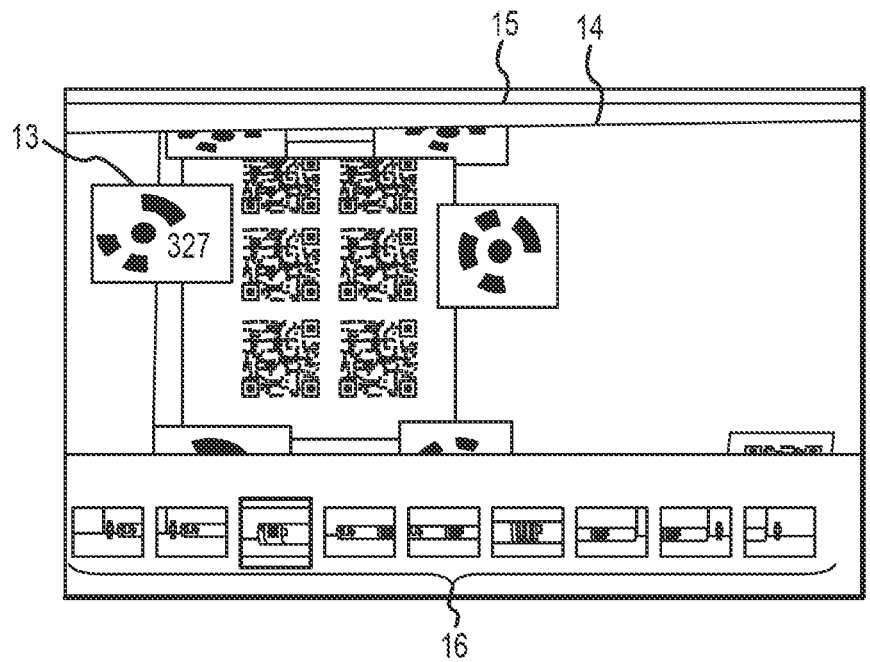

In order to capture the QR Code 12 data message, a switch is made to Photo Soft and the close-up photos are displayed. 327 Target 13 has been located as shown in FIG. 29.

Figure 30:
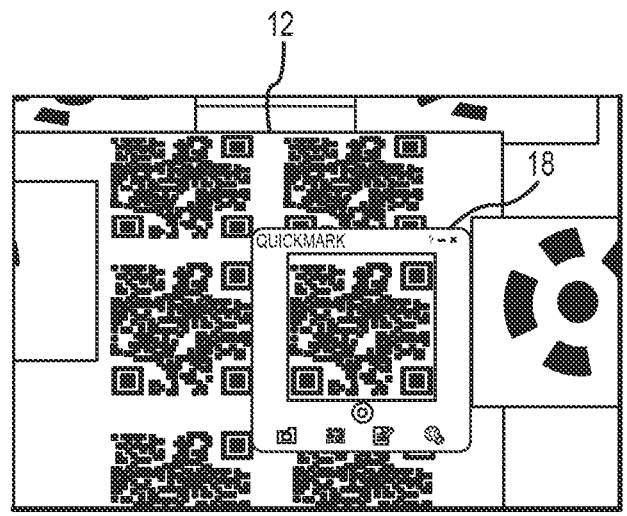

Next, as shown in FIG. 30, The QR Reader 18 is launched. One of the QR Code 12's is zoomed in on. The QR Reader 18 is positioned over it and the QR Code 12 data message is captured.

Figure 31:
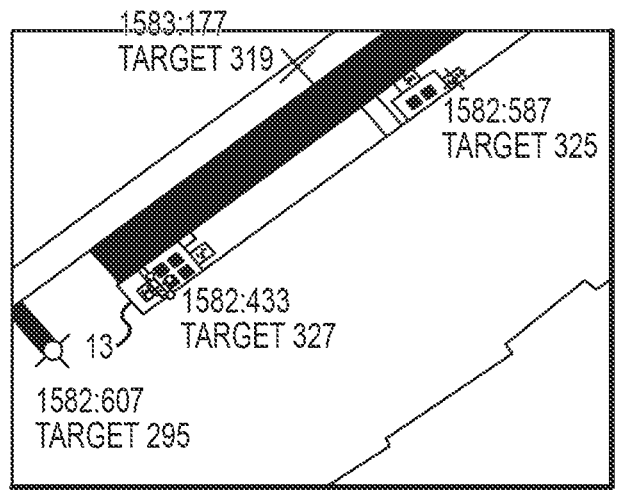

Switching back to AutoCAD, the point which corresponds to 327 Target 13 is located as shown in FIG. 31.

Figure 32:
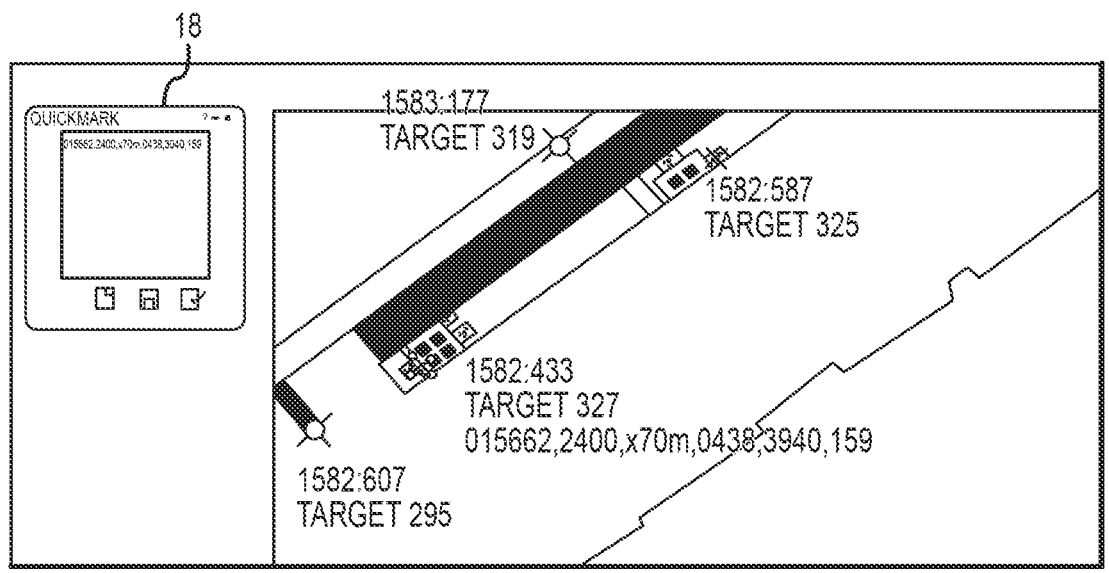

The QR Code 12 data message from QR Reader 18 is transferred to the AutoCAD database and the data is displayed as shown in FIG. 32.

Figure 33:
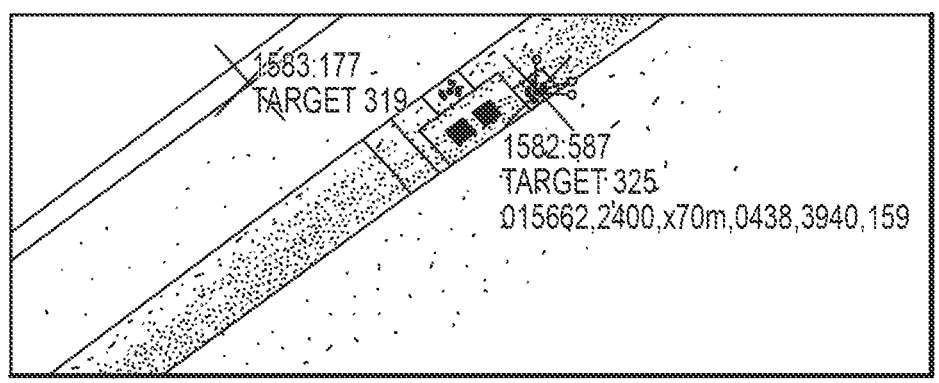

The same process is used for the other QR Codes 12 (i.e., go back to Photo Soft, highlight the close-up image of QR Code 12, zoom in, position QR Reader 18, capture the QR Code 12 data message, switch back to AutoCAD, locate the point for the target, and transfer the data message from QR Reader 18 to the database). At this time the points can also be repositioned. The image is turned off and the O-snap set to Node, which will allow the use of the point data from the cloud. The point is highlighted as shown in FIG. 33.

Figure 34:
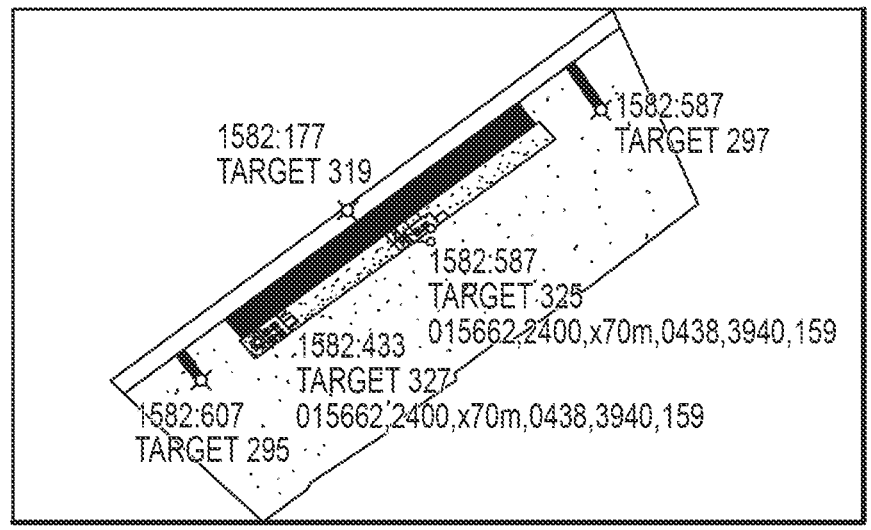

The point is moved to the center of the weld. It snaps to one of the points in the point cloud and now a proper X, Y, and Z for the weld is secured as shown in FIG. 34.

Figure 35:
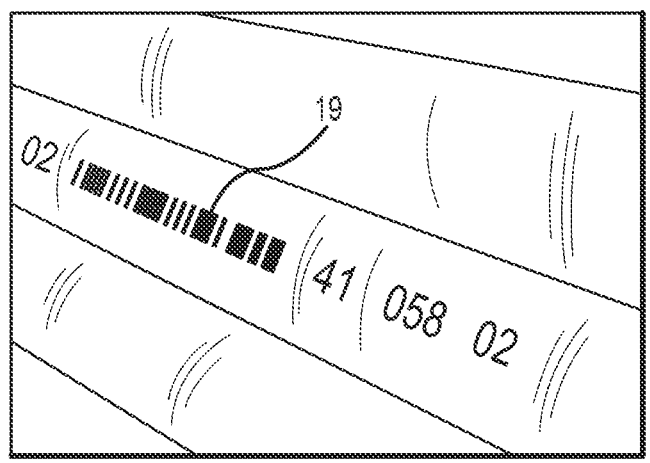
FIG. 35 shows a repetitive bar-code included on the full length of a pipe section.

A repetitive Bar-Code 19 is included on the full length of each pipe section as shown in FIG. 35. This approach will accommodate the identification of pups. A pup is a part of a joint of pipe cut off to be used elsewhere. Pups removed from a section of pipe at a tie-in can prove to be a challenge to track. A pup may be used in more than one tie-in. The Bar-Code 19 allows the pup to be tracked back to the joint from which it came. In this way the characteristics of the pup (wall thickness, coating, etc.) can be traced back to its origin. The repetitive Bar-Code 19 facilitates tracking the pup.

Process Development

Figure 38:
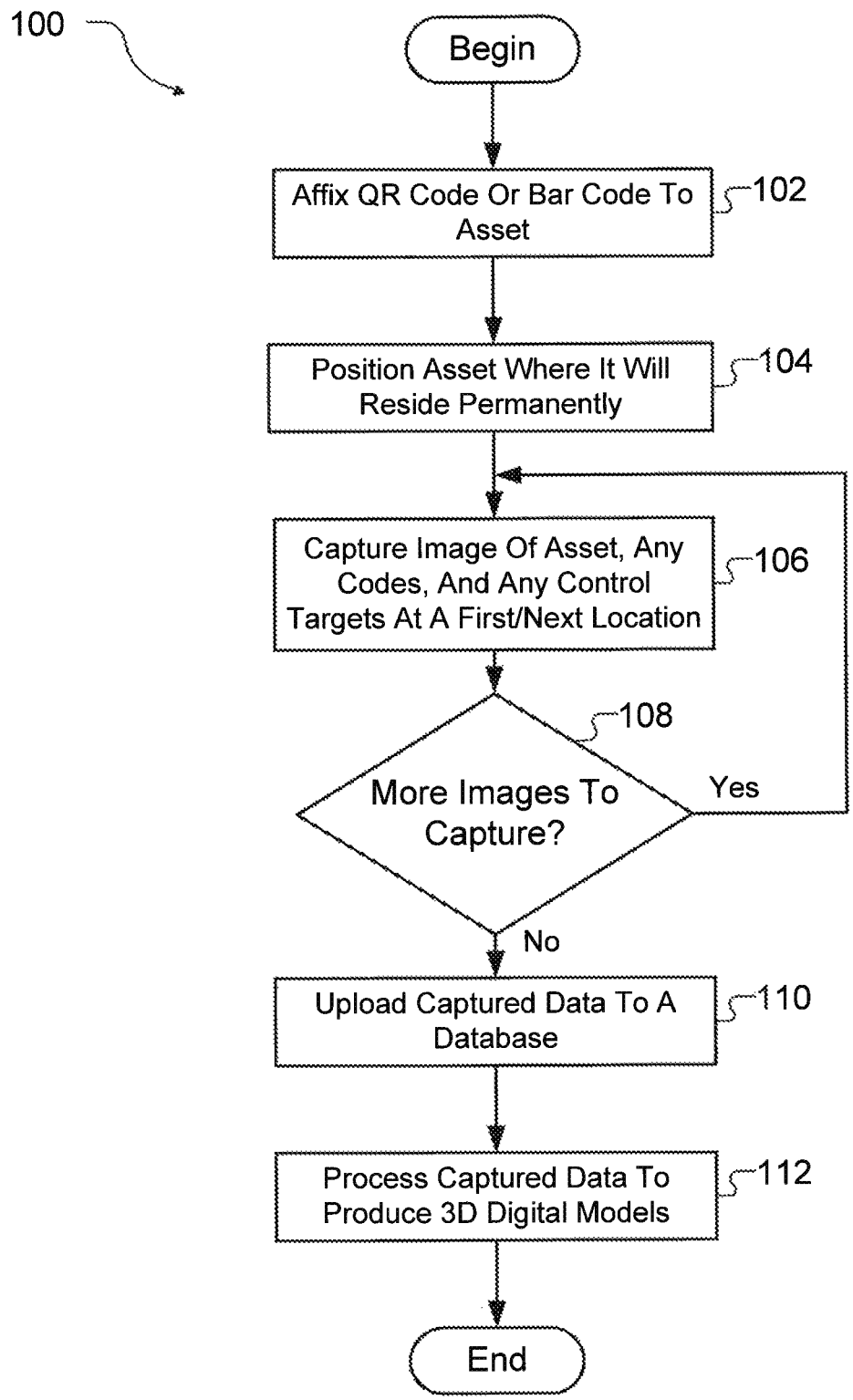
FIG. 38 shows a flow chart of the improved open-ditch pipeline as-built process in one embodiment.

The As-Built Process 100 as shown in FIG. 38 has two stages: 1) data collection, where digital information is captured; and 2) data processing, where that digital information is used to drive both the attributes of the asset and a 3D model of the asset.

As•Bullt Process 100 begins in Step 102 where optically read codes, such as QR Codes 12 and/or Bar-Codes 19, are affixed to the assets. These are affixed in the field if they were not affixed to the assets in the manufacturing process. Next, in Step 104 the assets are positioned in the ditch or trench where they will permanently reside. Alternatively, Step 102 may be performed after Step 104 instead of before. As shown above, in Step 106 3DLS and photogrammetry are two ways to quickly and efficiently gather the imagery and other digital information from which the attribute data and model data of the asset are derived in the processing step. With 3DLS, an operator utilizes a LiDAR scanner (see FIG. 36) to scan the asset, or, via a drone as discussed above. With photogrammetry, one camera or an array of multiple cameras affixed to a bracket are used to capture images of the asset (see FIG. 37) or, via a drone. With one pass, photos of the asset taken by each camera and taken from various angles are secured. Also, any control targets encountered are also captured.

A repeating loop in Step 108 is followed until there are no more images of the asset to capture. In Step 110 the imagery and/or digital data are uploaded to a computer for storage in a database, in anticipation of processing. In Step 112 the attributes and 3D models are derived from the uploaded data. The processing produces all of the asset features, attributes, and attendant features that have been captured in the field, and the process ends. Instead of taking weeks to develop deliverables that are usable by various stakeholders, the deliverables can be procured in just a matter of minutes or hours. The data processing stage described above can be further automated through program routines and algorithms to speed up the data processing stage.

Figure 39:
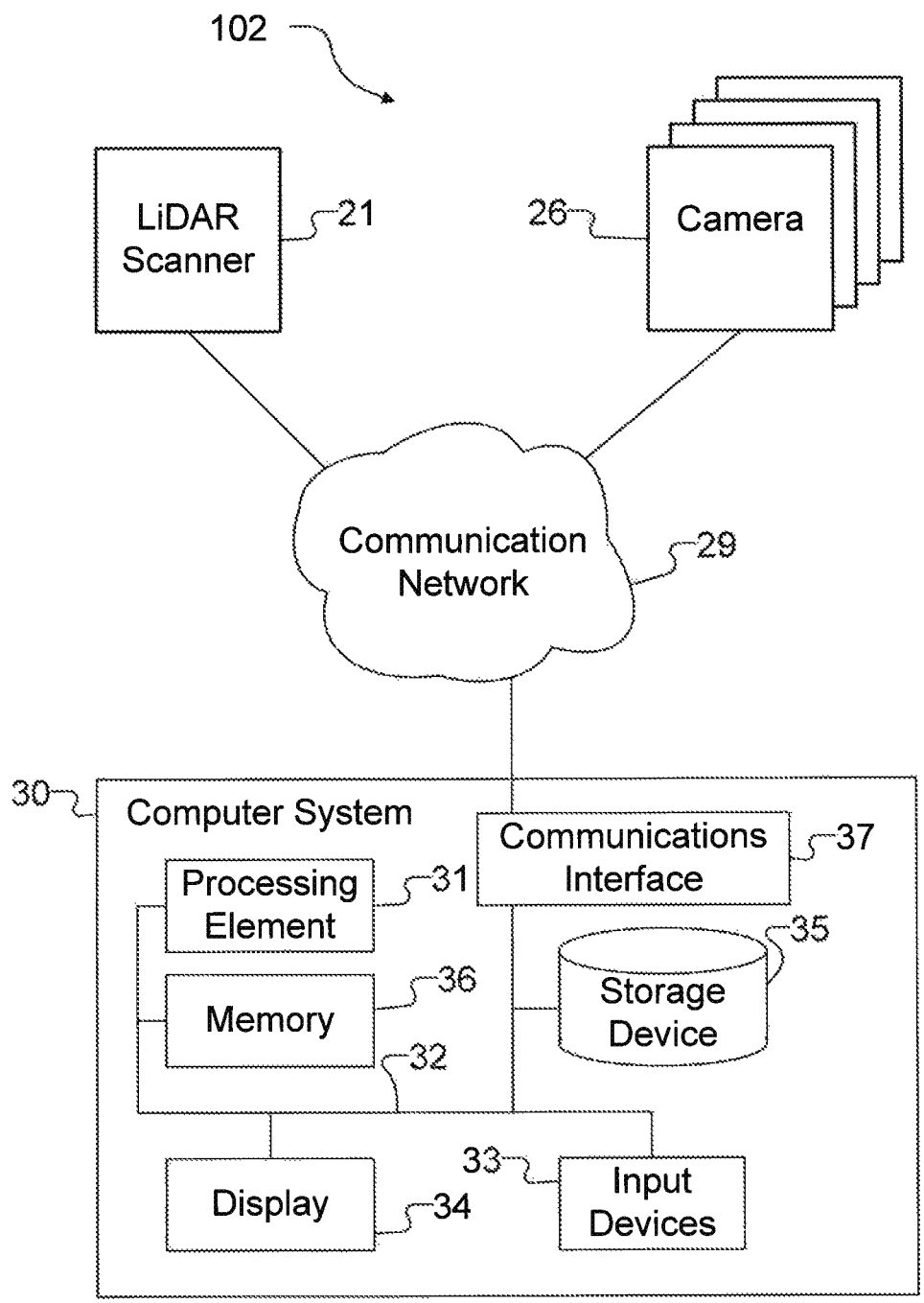
FIG. 39 shows a block diagram of a system for an improved open-ditch pipeline as-built process in one embodiment.

FIG. 39 shows a block diagram of a system for an improved open-ditch pipeline as-built process in one embodiment. Referring now to FIG. 39, As-Built System 102 may include LiDAR Scanner 21 or one or more Cameras 26 to capture both the attributes of the asset and the position of the encoded attributes on the asset. The captured data is uploaded over a Communication Network 29 to Computer System 30. Communication Network 29 may be the Internet, a local area network, a wireless cellular network, or any other suitable type of communication network or combinations of different types of networks connected together.

Components of Computer System 30 may include, but are not limited to, the following elements. Processing Element 31 communicates to other elements of the Computer System 30 over a System Bus 32. Input Devices 33, such as a keyboard, mouse, joy stick, or other type of pointing device allows a user to input information into Computer System 30, and a Graphics Display 34 allows Computer System 30 to output information to the user. Graphics Display 34 may also be touch screen enabled, allowing a user to input information into Computer System 30 through this mode. A Storage Device 35 is used to store data, such as in a database, and various software programs within Computer System 30. A Memory 36, also connected to System Bus 32, contains an operating system, and various software applications, such as AutoCAD and Photo Soft. A Communications Interface 37 is also connected to System Bus 32. Communications Interface 37 may have one or more serial ports, parallel ports, infrared ports, and the like. Connectable through Communications Interface 37 may be an external printer or scanner (not shown), as well as access to Communication Network 29.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood by those skilled in the art that many changes in construction and widely differing embodiments and applications will suggest themselves without departing from the scope of the disclosed subject matter.

What is claimed is:

1. A method for collecting and processing as-built data, the method comprising the steps of:
    (a) capturing one or more images of an asset and one or more images of one or more optically readable codes affixed to the asset after the asset has been positioned in a permanent place;
    (b) uploading the one or more images of the asset and the one or more images of the one or more optically readable codes to a database;
    (c) processing the one or more images of the asset to produce a 3D model of the asset;
    (d) processing the one or more images of the one or more optically readable codes to obtain attributes of the asset; and
    (e) linking the attributes of the asset positionally in the 3D model of the asset.

2. The method according to claim 1 wherein step (a) further comprises the step of:
    capturing an image of at least one QR code affixed to the asset.

3. The method according to claim 1 wherein step (a) further comprises the step of:
    capturing an image of at least one bar code affixed to the asset.

4. The method according to claim 1 wherein step (a) further comprises the step of:
    using a LiDAR scanner to capture the one or more images of the asset and the one or more images of the one or more optically readable codes.

5. The method according to claim 1 wherein step (a) further comprises the step of:
    using at least one camera to capture the one or more images of the asset and the one or more images of the one or more optically readable codes.

6. The method according to claim 5 further comprising the steps of:
    securing two or more cameras to a bracket; and
    capturing the one or more images of the asset and the one or more images of the one or more optically readable codes from one or more angles with the two or more cameras.

7. The method according to claim 1 wherein step (a) further comprises the step of:
    using a drone to capture the one or more images of the asset and the one or more images of the one or more optically readable codes.

8. The method according to claim 1 further comprising the step of:
    capturing one or more images of one or more photo identifiable targets nearby the asset that have a known center and a known place to establish an absolute position and a relative position of the asset.

9. The method according to claim 1 further comprising the step of:
    capturing one or more images of one or more photo identifiable targets located next to the one or more optically readable codes.

10. The method according to claim 9 further comprising the steps of:
    exporting the 3D model to a computer-aided design software application;
    creating with the computer-aided design software application a point cloud object; and
    viewing the point cloud object on a display with a viewer software application.

11. The method according to claim 10 further comprising the steps of:
    creating an ortho-photo with the viewer software application;
    exporting to the computer-aided design software application the positions of the plurality of photo identifiable targets in a CSV file; and
    importing a plurality of points corresponding to the positions of the plurality of photo identifiable targets into the point cloud object.

12. The method according to claim 10 further comprising the steps of:

viewing on the display one of the images of the one or more optically readable codes;

zooming in on a one of the optically readable codes;

launching a code reader of the viewer software application;

positioning the code reader over the one of the optically readable codes;

capturing the data message contained in the one of the optically readable codes;

transferring the data message to the database; and displaying on the display with the computer-aided design software application the contents of the data message.

13. The method according to claim 1 wherein the one or more images of the asset and the one or more images of one or more optically readable codes affixed to the asset are one of a digital image and a video image.

14. The method according to claim 1 wherein step (a) further comprises the step of:

using a drone to capture the one or more images of the asset and the one or more images of the one or more optically readable codes.

15. A method for collecting and processing as-built data, the method comprising the steps of:

(a) affixing a one or more optically readable codes to an asset;

(b) positioning the asset in a place where the asset will permanently reside;

(c) capturing one or more images of the asset and one or more images of the one or more optically readable codes after the asset has been positioned;

(d) uploading the one or more images of the asset and the one or more images of the one or more optically readable codes to a database;

(e) processing the one or more images of the asset to produce a 3D model of the asset;

(f) processing the one or more images of the one or more optically readable codes to obtain attributes of the asset; and (g) linking the 3D model of the asset with the attributes of the asset.

16. The method according to claim 15 wherein step (a) further comprises the step of:

affixing the one or more optically readable codes to the asset during the manufacturing process of the asset.

17. The method according to claim 15 wherein step (a) further comprises the step of:

affixing the one or more optically readable codes to the asset in the field where the asset will permanently reside.

18. The method according to claim 15 wherein step (a) further comprises the step of:

affixing at least one of a QR code and a bar code to the asset.

19. The method according to claim 15 wherein step (c) further comprises the step of:

using a LiDAR scanner to capture the one or more images of the asset and the one or more images of the one or more optically readable codes.

20. The method according to claim 15 wherein step (c) further comprises the step of:

using at least one camera to capture the one or more images of the asset and the one or more images of the one or more optically readable codes.

21. The method according to claim 20 further comprising the steps of:

securing two or more cameras to a bracket; and capturing the one or more images of the asset and the one or more images of the one or more optically readable codes from one or more angles with the two or more cameras.

22. The method according to claim 15 wherein step (b) further comprises the step of:

locating a plurality of photo identifiable targets nearby the asset that have a known center and a known place to establish an absolute position and a relative position of the asset.

23. The method according to claim 15 wherein step (a) further comprises the step of:

locating a plurality of photo identifiable targets next to the one or more optically readable codes.

24. The method according to claim 23 further comprising the steps of:

exporting the 3D model to a computer-aided design software application;

creating with the computer-aided design software application a point cloud object; and viewing the point cloud object on a display with a viewer software application.

25. The method according to claim 24 further comprising the steps of:

creating an ortho-photo with the viewer software application;

exporting to the computer-aided design software application the positions of the plurality of photo identifiable targets in a CSV file; and importing a plurality of points corresponding to the positions of the plurality of photo identifiable targets into the point cloud object.

26. The method according to claim 24 further comprising the steps of:

viewing on the display one of the images of the one or more optically readable codes;

zooming in on a one of the optically readable codes;

launching a code reader of the viewer software application;

positioning the code reader over the one of the optically readable codes;

capturing the data message contained in the one of the optically readable codes;

transferring the data message to the database; and displaying on the display with the computer-aided design software application the contents of the data message.

27. The method according to claim 15 wherein the one or more images of the asset and the one or more images of the one or more optically readable codes are one of a digital image and a video image.

28. A method for collecting and processing as-built data, the method comprising the steps of:

(a) receiving in a database a single stream of data comprising one or more images of one or more assets and one or more images of one or more optically readable codes affixed to the one or more assets after the one or more assets had been positioned in a permanent place;

(b) processing the one or more images of the one or more assets to produce a 3D model of the one or more assets;

(c) processing the one or more images of the one or more optically readable codes to obtain attributes of the one or more assets; and (d) linking the attributes of the one or more assets positionally in the 3D model of the one or more assets.

29. The method according to claim 28 further comprising the step of:

capturing the one or more images of the one or more assets and the one or more images of one or more optically readable codes affixed to the one or more assets with at least one of a LiDAR scanner, a digital camera, or a video camera.

30. The method according to claim 28 further comprising the steps of:
  establishing an absolute position of the one or more assets by at least one of:
  capturing one or more images of one or more photo identifiable targets nearby the one or more assets that have a known center and a known place; and
  obtaining GPS data at the time that the one or more images of the one or more assets are captured.

\* \* \* \* \*